(12) United States Patent
Saroka et al.

(10) Patent No.: US 11,639,109 B2
(45) Date of Patent: May 2, 2023

(54) TRANSPORTATION REFRIGERATION SYSTEM WITH ENERGY STORAGE DEVICE

(71) Applicant: Carrier Corporation, Palm Beach Gardens, FL (US)

(72) Inventors: Mary D. Saroka, Syracuse, NY (US); Jeffrey J. Burchill, Baldwinsville, NY (US)

(73) Assignee: CARRIER CORPORATION, Palm Beach Gardens, FL (US)

( * ) Notice: Subject to any disclaimer, the term of this patent is extended or adjusted under 35 U.S.C. 154(b) by 391 days.

(21) Appl. No.: 16/753,004

(22) PCT Filed: Oct. 5, 2018

(86) PCT No.: PCT/US2018/054579
§ 371 (c)(1),
(2) Date: Apr. 2, 2020

(87) PCT Pub. No.: WO2019/071109
PCT Pub. Date: Apr. 11, 2019

(65) Prior Publication Data
US 2020/0290459 A1  Sep. 17, 2020

Related U.S. Application Data (60) Provisional application No. 62/568,809, filed on Oct. 6, 2017.

(51) Int. Cl.
*B60L 1/00* (2006.01)
*F25D 11/00* (2006.01)
*B60P 3/20* (2006.01)

(52) U.S. Cl.
CPC ............ *B60L 1/003* (2013.01); *F25D 11/003* (2013.01); *B60P 3/20* (2013.01); *F25D 2600/00* (2013.01)

(58) Field of Classification Search
CPC ........ B60P 3/20; B60L 1/003; F25D 2600/00; F25D 11/003
See application file for complete search history.

(56) References Cited

U.S. PATENT DOCUMENTS 3,475,919 A  11/1969  Ellis
4,780,618 A  10/1988  Wareman et al.
(Continued)

FOREIGN PATENT DOCUMENTS

CN  101898500 B  12/2011
CN  105584406 A  5/2016
(Continued)

OTHER PUBLICATIONS

WO-2012144664-A1 translation.*
(Continued)

*Primary Examiner* — Elizabeth J Martin
(74) *Attorney, Agent, or Firm* — Cantor Colburn LLP (57) ABSTRACT

Techniques for operating a transport refrigeration system with an energy storage device include producing a first output and a second output at an energy storage device (ESD), and converting the first output and the second output to a converted first output and a converted second output. The techniques also include supplying the converted first output and the converted second output to components of the transport refrigeration system, and operating the components of the transport refrigeration system using the converted first output and the converted second output.

20 Claims, 5 Drawing Sheets

(56) References Cited

U.S. PATENT DOCUMENTS

| | | |
|---|---|---|
| 7,151,326 B2 | 12/2006 | Jordan |
| 8,935,933 B1 | 1/2015 | Koelsch |
| 9,415,660 B2 | 8/2016 | Koelsch |
| 9,586,458 B2 | 3/2017 | Larson et al. |
| 9,689,598 B2 | 6/2017 | Truckenbrod et al. |
| 9,707,844 B2 | 7/2017 | Arnold et al. |
| 2009/0056354 A1 | 3/2009 | Davis et al. |
| 2009/0133419 A1* | 5/2009 | Matsuno ............... F25B 27/00 62/239 |
| 2010/0045105 A1 | 2/2010 | Bovio et al. |
| 2014/0283533 A1 | 9/2014 | Kurtzman et al. |
| 2017/0210194 A1 | 7/2017 | Ling |
| 2017/0349078 A1* | 12/2017 | Dziuba .............. B60H 1/00428 |

FOREIGN PATENT DOCUMENTS

| | | | |
|---|---|---|---|
| EP | 2689944 A2 | 1/2014 | |
| JP | 2002323280 A | 11/2002 | |
| WO | 2012144664 A1 | 10/2012 | |
| WO | WO-2012144664 A1 * | 10/2012 | ............... B60P 3/20 |
| WO | 2014070633 A1 | 5/2014 | |
| WO | 2016147022 A1 | 9/2016 | |

OTHER PUBLICATIONS

International Search Report/Written Opinion for International Application No. PCT/2018/054579; International Filing Date: Oct. 6, 2018; dated Feb. 8, 2019, 17 pages.

\* cited by examiner

TRANSPORTATION REFRIGERATION SYSTEM WITH ENERGY STORAGE DEVICE

CROSS REFERENCE TO RELATED APPLICATIONS

This application is a National Stage application of PCT/US2018/054579, filed Oct. 5, 2018, which claims the benefit of U.S. Provisional Patent Application No. 62/568,809, filed Oct. 6, 2017, both of which are incorporated by reference in their entirety herein.

BACKGROUND

The present invention generally relates to "all-electric" transport refrigeration systems, and more specifically, to transport refrigeration systems with energy storage devices.

Transport refrigeration systems are used with refrigerated trucks and/or trailers to provide protection for perishable foods, medicines, and other products during transport. Other applications for the transport refrigeration systems include containers, cargo, railroads, etc. The transport refrigeration systems include a transport refrigeration unit having a compressor, condenser, evaporate fans, and other components which operate to provide the cooling necessary for the systems. As environmental concerns and regulations change, transport refrigeration systems are shifting to quieter and cleaner operations by using different components in its configuration to provide power for its operation.

BRIEF DESCRIPTION

According to one embodiment, a method of operating a transport refrigeration system includes producing a first output and a second output at an energy storage device (ESD), converting the first output and the second output to a converted first output and a converted second output, supplying the converted first output and the converted second output to components of the transport refrigeration system, and operating the components of the transport refrigeration system using the converted first output and the converted second output.

In addition to one or more of the features described above, or as an alternative, further embodiments may include transforming the converted first output prior to supplying power to the components of the transport refrigeration system.

In addition to one or more of the features described above, or as an alternative, further embodiments may include wherein the converting converts the first output of the ESD to a converted first output and the second output of the ESD to a converted second output, wherein the converted first output has a different voltage than the converted second output.

In addition to one or more of the features described above, or as an alternative, further embodiments may include receiving grid power at a transformer to recharge the ESD.

In addition to one or more of the features described above, or as an alternative, further embodiments may include wherein operating the transport refrigeration system includes using power from the ESD, wherein the ESD is a rechargeable battery pack.

In addition to one or more of the features described above, or as an alternative, further embodiments may include wherein operating the transport refrigeration system includes using grid power.

In addition to one or more of the features described above, or as an alternative, further embodiments may include wherein operating the transport refrigeration system includes using grid power and power from the ESD.

In addition to one or more of the features described above, or as an alternative, further embodiments may include wherein the first output and the second output is provided by a common ESD.

In addition to one or more of the features described above, or as an alternative, further embodiments may include wherein the transport refrigeration system is coupled with at least one of a refrigerated truck or refrigerated trailer.

According to another embodiment, a system includes a controller, an energy storage device (ESD), a transport refrigeration system including one or more components, a first invertor electrically coupled to the ESD and a component of the transport refrigeration system, and a second invertor electrically coupled to the ESD and a component of the transport refrigeration system.

In addition to one or more of the features described above, or as an alternative, further embodiments may include wherein the first inverter converts a first output of the ESD to a converted first output and the second inverter converts a second output of the ESD to a converted second output, wherein the converted first output has a different voltage than the converted second output.

In addition to one or more of the features described above, or as an alternative, further embodiments may include a transformer, wherein the transformer is electrically coupled to the first invertor and a compressor of the transport refrigeration system, wherein the transformer converts the converted first output from the first invertor to a voltage supplied to the compressor.

In addition to one or more of the features described above, or as an alternative, further embodiments may include a fan, wherein the fan is electrically coupled to the second inverter, wherein the second inverter provides a DC signal to power the fan.

In addition to one or more of the features described above, or as an alternative, further embodiments may include wherein the transformer is configured to receive grid power to operate the transport refrigeration system and recharge the ESD.

In addition to one or more of the features described above, or as an alternative, further embodiments may include wherein a first output and a second output are produced by a common ESD.

In addition to one or more of the features described above, or as an alternative, further embodiments may wherein the one or more components of transport refrigeration system comprises at least an evaporator fan, radiator fan, condenser fans, compressor, and one or more sensors.

In addition to one or more of the features described above, or as an alternative, further embodiments may include wherein the ESD is a rechargeable ESD.

In addition to one or more of the features described above, or as an alternative, further embodiments may include wherein the ESD is a lithium-ion battery pack.

In addition to one or more of the features described above, or as an alternative, further embodiments may include wherein the first invertor is a DC/AC invertor and the second invertor is a DC/DC invertor.

In addition to one or more of the features described above, or as an alternative, further embodiments may include wherein the transport refrigeration system is coupled with at least one of a refrigerated truck or a refrigerated trailer.

BRIEF DESCRIPTION OF THE DRAWINGS

The following descriptions should not be considered limiting in any way. With reference to the accompanying drawings, like elements are numbered alike.

DETAILED DESCRIPTION

In traditional transport refrigeration systems, diesel engines have been used to power the various components of the refrigeration system. When in operation, the diesel engines produce gas emissions as the diesel fuel combusts to convert the fuel into power for driving the systems. In addition to the gas emissions, the diesel engine produces noise emissions which add to the noise pollution emitted by the automobiles.

In one or more embodiments, the techniques described herein replace the diesel engine power with an energy storage device (ESD) for power to address the gas and noise emissions of the conventional systems.

Figure 1:
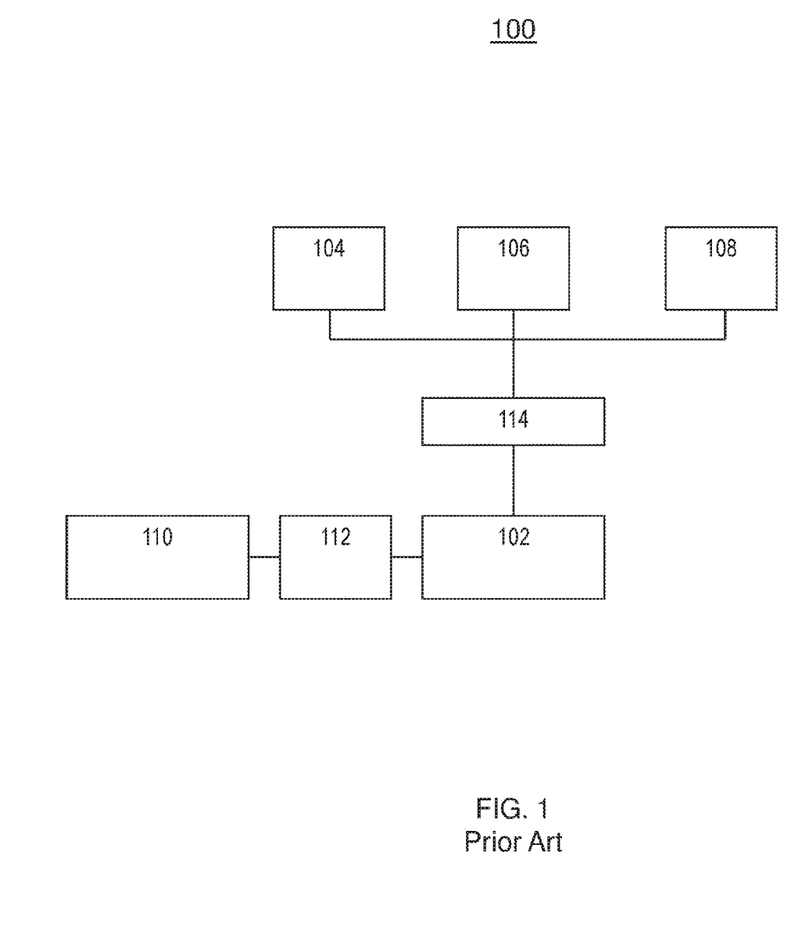
FIG. 1 depicts a refrigeration system.

Referring to FIG. 1, a system 100 is shown. The system 100 includes a diesel engine system 102 for generating the power for the components of the refrigeration system. The diesel engine system can include other components and equipment including an exhaust system, radiator, etc. (not shown in FIG. 1). The components of the refrigeration system can include the evaporator fan 104, condenser fan 106, and sensors 108. The refrigeration system can also include other components that are known to be associated with refrigeration systems, such as condenser, expansion device, evaporator, thermostats, fans, different types of coils, etc.

The diesel engine system 102 can be used to provide power for different systems of the transport vehicle. For example, the diesel engine system 102 can provide power to operate the transport vehicle itself, refrigeration systems, and other types of systems. The diesel engine system 102 is mechanically coupled to a high voltage AC generator 112 to provide electrical power to the compressor 110 and is also mechanically coupled to an alternator 114 to provide low voltage DC to the evaporator fan 104, condenser fan 106, and sensors 108.

The evaporator fan 104 is used in conjunction with an evaporator in the refrigeration system to convert a refrigerant from the liquid state to the gas state. As the refrigerant changes into the gas state, heat is absorbed from the surrounding air which results in the cooling of the air which can be used for cooling applications such air conditioning and refrigeration.

The condenser fan 106 can used to remove heat from the refrigerant prior to sending the refrigerant to an expansion device. The condenser fan 106 can be used in combination with a condenser to remove heat from the refrigerant by exhausting the heat to the external environment. A compressor 110 increases pressure and temperature of refrigerant exiting the evaporator, as known in the art.

The sensors 108 can be used to monitor and/or control the temperature of the system. Sensors 108 can be used in combination with thermostat to detect when a temperature has been reached.

The diesel engine system 102 generates both gas emissions and noise emissions. The techniques and configurations described herein provide for an all-electric system.

Figure 2:
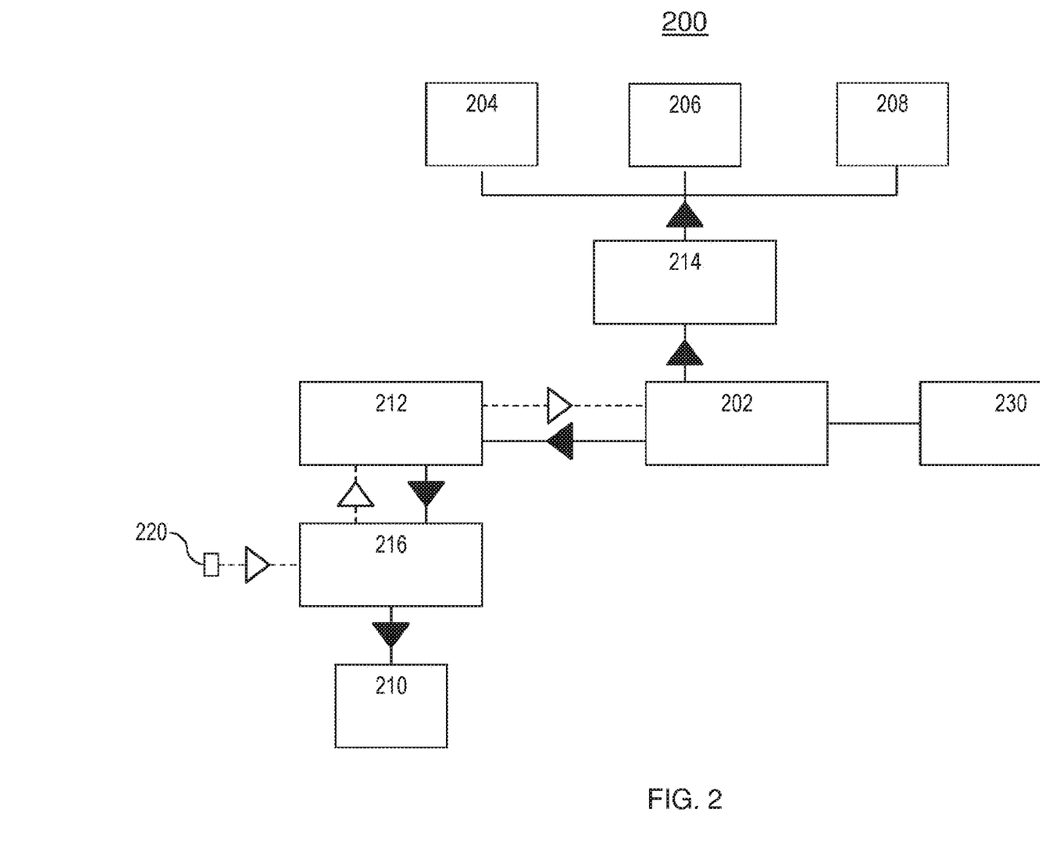
FIG. 2 depicts a block diagram of a transport refrigeration system with an energy storage devices in accordance with one or more embodiments.

Referring now to FIG. 2, a system 200 for a transport refrigeration system with an energy storage device is shown. The system 200 includes an energy storage device (ESD) 202, a controller 230, and refrigeration components including an evaporator fan 204, condenser fan 206, sensors 208, and compressor 210. The condenser fan 206 may also serve as a radiator fan, or a separate radiator fan may be used. The system 200 also includes inverters 212, 214 and a transformer 216. The system 200 is also configured to receive grid power 220 to operate the system 200 or recharge the ESD 202. It is to be understood that other components (not shown) may be incorporated into the transport refrigeration system as desired.

The dark arrows represent the power flow from the ESD to the components of the system 200. The light arrows represent the power flow of the power received from the grid power 220. The grid power 220 is received at the transformer 216. Then the grid power 220 is sent to the first inverter 212, then along to the ESD 202 for charging.

In one or more embodiments, the system 200 depicts an all-electric transport refrigeration system using a battery pack as the ESD 202. For example, a battery pack can have a power output of 350V DC to the system 220. In other examples, the power output of the battery pack can range between 300-400V DC. The battery pack can include a plurality of lithium-ion batteries, where the one or more batteries are serially connected to each other to provide 350V DC and 7 kW hours of operation. It is to be understood that other configurations and types of batteries can be used to achieve the desired cooling needs.

In one or more embodiments, a battery management system can be used to control the power that is produced by the battery pack. In a non-limiting example, a controller for a refrigeration truck can be coupled to the battery management system to control the battery management system.

The ESD 202, as shown, is electrically coupled to a first inverter 212 and a second inverter 214. The electrical coupling can be achieved using wires, cables, harnesses, connections, etc. as known to one of ordinary skill in the art. In an embodiment, the first invertor 212 is configured to convert the high voltage (HV) DC signal from the ESD to a 3-phase AC signal at one or more frequencies. For example, the 350V DC signal from the battery pack is converted to a 3-phase AC (e.g., 150-300V AC). As shown in FIG. 2, the AC signal from the first inverter 212 is stepped up using transformer 216. For example, the AC is stepped up in voltage to 300-600V AC to power the compressor 210 of the refrigeration system (e.g., 460V).

In an embodiment, the second inverter 214 is configured to convert the HV DC from the battery pack to a low voltage (LV) necessary to power the various components of the refrigeration system or other equipment/devices. The LV DC power can range from 10-30V DC (e.g., 12V). As a non-limiting example, the second inverter 214 is a DC/DC inverter which is used to power fan motors, controllers, and sensors.

It is to be understood that various power inverters and converters, such as AC to DC rectifiers, DC to AC inverters, AC to AC voltage/frequency converters, and DC to DC voltage converters, may be employed in connection with the ESD as needed.

In one or more embodiments, the transformer 216 is used to step up the voltage to 460V, 3-phase AC to match the requirements of each of the connected components or equipped that will be attached such as an AC driven motor or compressor.

In one or more embodiments, a transformer 216 is used to receive grid power and charge the battery pack or other rechargeable ESD. In the non-limiting refrigeration truck example, the system 200 can be connected to grid power 220 when the refrigeration truck including the transport refrigeration system returns to a warehouse or is at a delivery location that is configured to provide grid power. The "white" arrows depict the path the electric signal follows to charge the battery pack. In other embodiments, the grid power can be used to power the components of the refrigeration system. In a different embodiment, both battery power and grid power can be used simultaneously to power the components of the refrigeration system. It is to be understood that other types of power sources can be used in conjunction with one or more of the embodiments.

Figure 3:
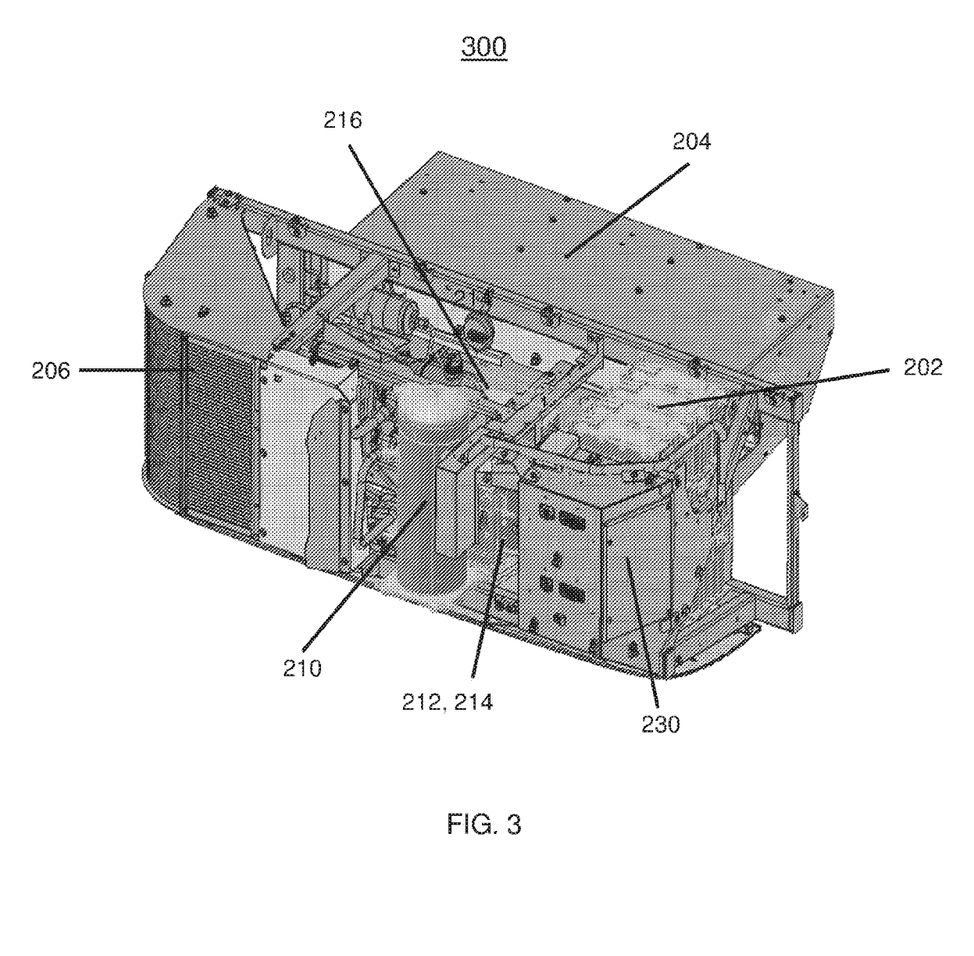
FIG. 3 depicts an alternative view of a transport refrigeration system with an energy storage devices in accordance with one or more embodiments.

Now referring to FIG. 3, an arrangement 300 of the transport refrigeration system 200 in accordance with one or more embodiments is shown. The arrangement 300 depicts a location of the ESD 202, evaporator fan 204, condenser fan 206, compressor 210, first and second inverter 212, 214, transformer 216, and controller 230. In FIG. 3, the evaporator fan 204, condenser fan 206, and other components may not be readily visible but are positioned within the transport refrigeration system 200 in a location indicated by the lead lines. It is to be understood that the components can be arranged in a different configuration and/or other components and equipment can be used in the transport refrigeration system 200.

Figure 4:
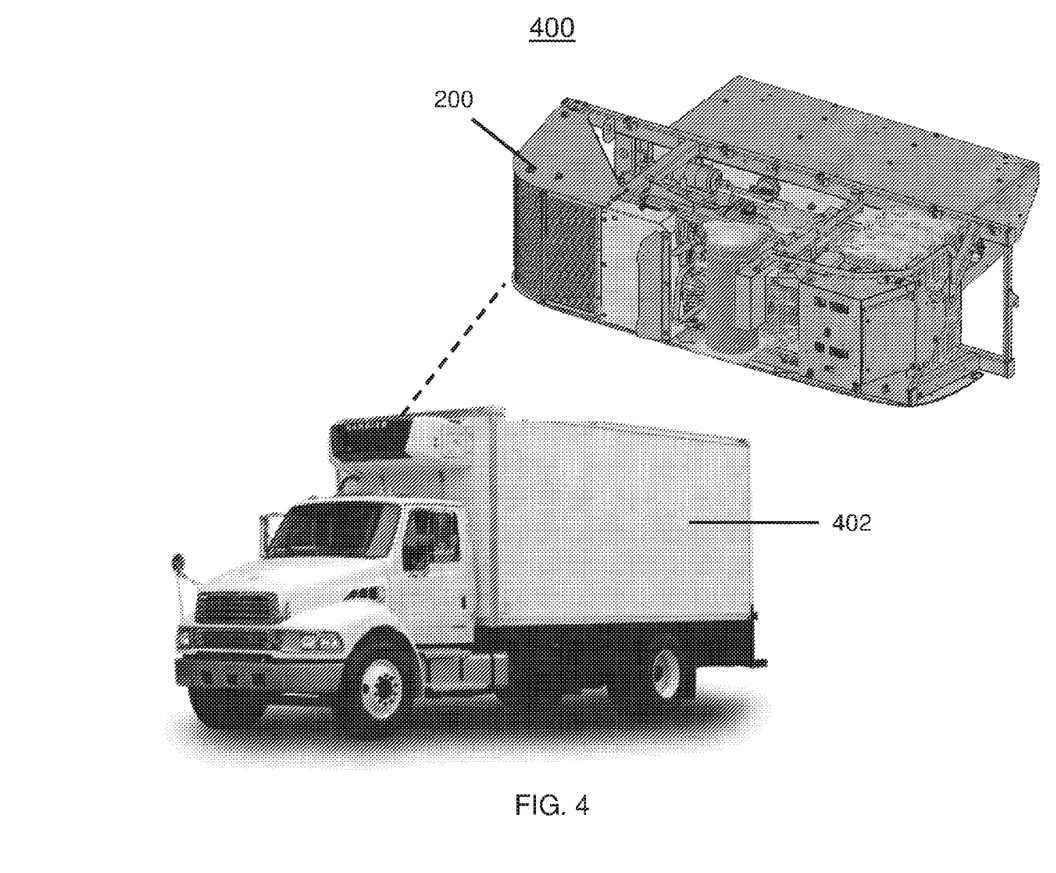
FIG. 4 depicts a diagram of a transport refrigeration system with an energy storage devices in accordance with one or more embodiments.

Referring to FIG. 4, a system 400 implementing a transport refrigeration system in accordance with one or more embodiments is shown. FIG. 4 depicts a vehicle 402 where the transport refrigeration system 200 has been integrated into the cargo/storage area of the vehicle 200 to regulate the temperature of the cargo. The dotted line indicates the relationship between the transport refrigeration system 200 and the vehicle 402. In some embodiments, the location of the transport refrigeration system 200 can be positioned in a different location on the vehicle 402 such as, but not limited to, the back of the vehicle, inside the cargo area, on top of the cargo area, etc. In one or more embodiments, the vehicle 402 is a truck. It is to be understood that the transport refrigeration system 200 can be incorporated into other types of vehicles and/or transport equipment that need to regulate the temperature of their cargo during transport such as trains, trailers, recreational vehicles, and the like.

Figure 5:
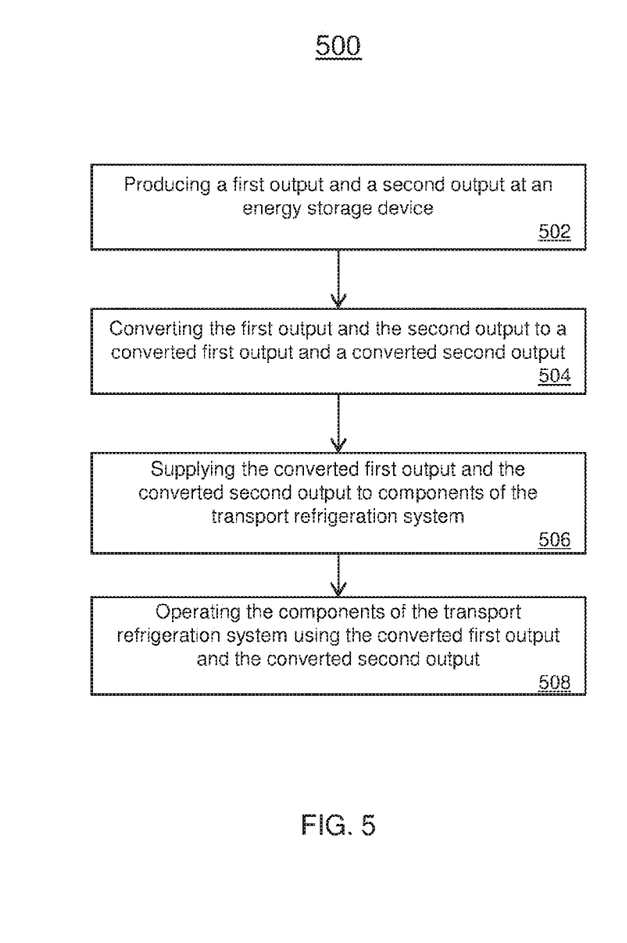
FIG. 5 depicts a flow diagram for a transport refrigeration system with energy storage devices in accordance with one or more embodiments.

Referring now to FIG. 5, a method 500 of operating a transport refrigeration system is illustrated. Block 502 provides producing first output and a second output. The outputs provide power for operating various devices and equipment. In one or more embodiments, the first output and the second output are produced from an ESD. The first output and second output may be the same electrical source, e.g., 350 VDC. In this non-limiting example, the ESD is a rechargeable lithium-ion battery pack that is shown as having two connections for providing the power to the connected components. In some embodiments, the first output and a second output are produced by a common ESD, and in other embodiments, one or more ESDs can be used to produce one or more outputs. It should be understood that one or more connections can be provided.

Block 504 provides converting the first output and the second output to a converted first output and a converted second output. In some embodiments, the power is converted from a first form to a second form. The power can be converted to power low voltage devices using an inverter/converter. The power can also be converted to power high voltage devices using an inverter/converter. In a non-limiting example, a first invertor can be a DC/AC invertor for HV applications and the second invertor is a DC/DC invertor for LV applications.

In one or more embodiments, a transformer can be coupled to an inverter to convert, by stepping up the voltage, a converted first output from the first invertor or the converted second output from the second inverter prior to supplying power to components of the transport refrigeration system. In some embodiments, the transformer is configured to receive grid power to operate the transport refrigeration system and recharge the energy storage device.

Block 506 provides supplying the first converted first output and the converted second output to components of the transport refrigeration system. After the power is converted, it can be used supply power to the electrically coupled equipment and devices.

Block 508 provides operating the components of the refrigeration system using the converted first output and the converted second output. In this non-limiting example, the refrigeration system of a refrigeration truck or trailer is operated using the converted power.

The system described herein depicts an all-electric transport refrigeration system using a battery pack to provide power to the components of the system. The techniques described herein provide a system that reduces noise emissions and other emissions.

A detailed description of one or more embodiments of the disclosed apparatus and method are presented herein by way of exemplification and not limitation with reference to the Figures.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The techniques described herein provide a transportation refrigeration truck unit that is fully operated using a non-diesel power source. This configuration results in operating the unit without both fuel emissions and high sound emissions associated with a diesel powered traditional unit.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A method for operating a transport refrigeration system with energy storage, the method comprising:
    using an energy storage device (ESD) to produce a first direct current (DC) output and a second DC output;
    using a DC to alternating current (DC/AC) inverter to convert the first DC output to a converted AC output;
    using a DC/DC inverter to convert the second DC output to a converted DC output comprising a stepped down voltage level that is appropriate for DC components of the transport refrigeration system;
    supplying the converted AC output to AC components of the transport refrigeration system;
    supplying the converted DC output to the DC components of the transport refrigeration system; and
    operating the AC components of the transport refrigeration system and the DC components of the transport refrigeration system using the converted AC output and the converted DC output.

2. The method of claim 1, further comprising transforming the converted DC output prior to supplying power to components of the transport refrigeration system.

3. The method of claim 1, wherein using the DC/AC inverter to convert the first DC output to the converted AC output further comprises providing the converted AC output at a stepped up AC voltage level that is appropriate for the AC components of the transport refrigeration system.

4. The method of claim 1, further comprising:
    receiving grid power at a transformer to recharge the ESD.

5. The method of claim 1, wherein operating the transport refrigeration system includes using power from the ESD, wherein the ESD is a rechargeable battery pack.

6. The method of claim 1, wherein operating the transport refrigeration system includes using grid power.

7. The method of claim 1, wherein operating the transport refrigeration system includes using grid power and power from the ESD.

8. The method of claim 1, wherein the first DC output and the second DC output are provided by a common ESD.

9. The method of claim 1, wherein the transport refrigeration system is coupled with at least one of a refrigerated truck or a refrigerated trailer.

10. A system comprising:
    a controller operably coupled to an energy storage device (ESD);
    wherein the controller is operable to control the ESD to provide a first direct current (DC) output and a second DC output;
    a transport refrigeration system;
    a DC to alternating current (DC/AC) invertor electrically coupled to the first DC output of the ESD and an AC component of the transport refrigeration system; and
    a DC/DC invertor electrically coupled to the second DC output of the ESD and a DC component of the transport refrigeration system.

11. The system of claim 10, wherein the DC/AC inverter converts the first DC output of the ESD to a converted AC output and the DC/DC inverter converts the second DC output of the ESD to a converted DC output comprising a stepped down voltage level that is appropriate for DC components of the transport refrigeration system.

12. The system of claim 11, further comprising:
    a transformer, wherein the transformer is electrically coupled to the DC/AC invertor and the AC component of the transport refrigeration system, wherein the AC component comprises a compressor of the transport refrigeration system, wherein the transformer converts the converted AC output from the DC/AC invertor to a stepped up AC voltage level that is appropriate for providing power to the compressor.

13. The system of claim 12, wherein:
    the DC component comprises a fan;
    the fan is electrically coupled to the DC/DC inverter; and
    the DC/DC inverter provides the converted DC output to power the fan.

14. The system of claim 12, wherein the transformer is configured to receive grid power to operate the transport refrigeration system and recharge the ESD.

15. The system of claim 13, wherein the ESD comprises a common ESD.

16. The system of claim 11, wherein comprising a stepped down voltage level that is appropriate for DC components of the transport refrigeration system the first invertor is a DC/AC invertor and the second invertor is a DC/DC invertor.

17. The system of claim 10, wherein the DC component of the transport refrigeration system comprises at least one of an evaporator fan, radiator fan, condenser fans, compressor, and one or more sensors.

18. The system of claim 10, wherein the ESD is a rechargeable energy storage device.

19. The system of claim 10, wherein the ESD is a lithium-ion battery pack.

20. The system of claim 10, wherein the transport refrigeration system is coupled with at least one of a refrigerated truck or a refrigerated trailer.

* * * * *